United States Patent

Papuchon et al.

[11] Patent Number: 5,123,025
[45] Date of Patent: Jun. 16, 1992

[54] MINIATURE OPTICAL SOURCE

[75] Inventors: Michel Papuchon, Massy; Jean-Pierre Huignard, Paris; Eric Lallier, Levallois; Jean-Paul Pocholle, Arpajon/La Norville, all of France

[73] Assignee: Thomson-CSF, Puteaux, France

[21] Appl. No.: 620,026

[22] Filed: Nov. 30, 1990

[30] Foreign Application Priority Data

Dec. 1, 1989 [FR] France ............ 89 15877

[51] Int. Cl.$^5$ .................... H01S 3/091
[52] U.S. Cl. .................... 372/72; 372/21; 372/75; 359/326; 359/328
[58] Field of Search .......... 372/21, 22, 75, 72, 372/41; 307/425, 427; 359/326, 328

[56] References Cited

U.S. PATENT DOCUMENTS

| | | | |
|---|---|---|---|
| 4,731,787 | 3/1988 | Fan et al. | 372/75 |
| 4,739,507 | 4/1988 | Byer et al. | 572/101 |
| 4,884,281 | 11/1989 | Hawthorn et al. | 372/22 |
| 4,953,166 | 8/1990 | Mooradian | 372/21 |
| 5,030,851 | 7/1991 | Vternahrer | 372/22 |

FOREIGN PATENT DOCUMENTS 0327310 8/1989 European Pat. Off. .

OTHER PUBLICATIONS

Leos '88, Lasers and Electro-Optics Society Annular Meeting Conference Proceedings, Nov. 2-4, 1988, pp. 352-355, J. T. Lin, "Recent Advances of Nonlinear Optical Crystals".

Primary Examiner—Georgia Y. Epps
Attorney, Agent, or Firm—Oblon, Spivak, McClelland, Maier & Neustadt

[57] ABSTRACT

A miniature optical source which includes at least one thin film of active laser materials having, in addition, non-linear properties. A pump laser for emitting a beam of a wavelength allowing for the pumping of the thin film of active laser material perpendicularly to the plane of the thin film. Also, an optical cavity constituted by two mirrors whose coefficients of reflection are maximum at the laser wavelength of the active laser material is further provided. The miniature optical source may find particular application in a physically compact laser emitting in the visible spectrum.

6 Claims, 3 Drawing Sheets

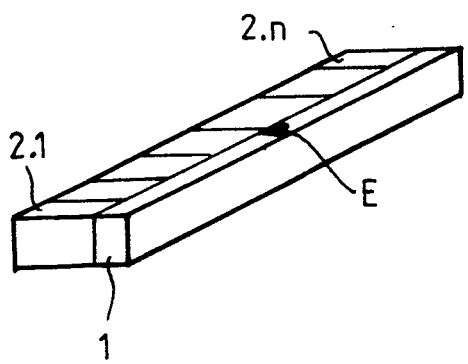
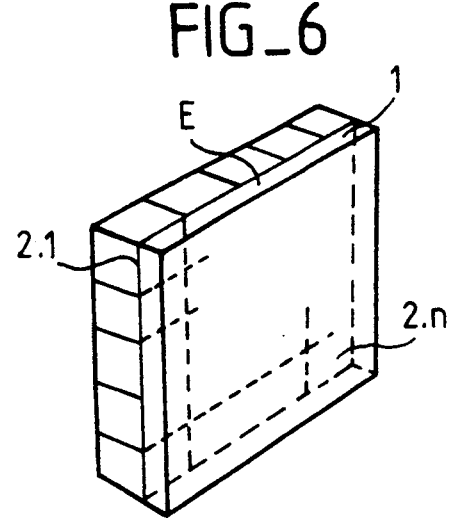

MINIATURE OPTICAL SOURCE

BACKGROUND OF THE INVENTION

The invention concerns a miniature optical source and, in particular, a miniature optical source emitting at wavelengths in the visible light spectrum. The invention also concerns a method of construction of such a source.

Miniature sources emitting in the visible spectrum are of great interest for example in the field of optical recording/reading of information. In this case, shorter optical wavelengths permit a higher density of information storage.

Several solutions can be envisaged, such as the construction of a laser emitting visible light directly or using the principles of non-linear optics to generate an optical wave in the visible range from a wave in the short infrared.

It is clear that it is important to be able to design a miniaturized source. According to the invention, a solution is proposed which achieves these results by using the following technique: construction of a solid laser pumped by a diode laser, the active medium being also non-linear and having the form of a thin plate which can be optically coupled to the source of the pump without intermediate parts.

SUMMARY OF THE INVENTION

More precisely, the invention concerns a miniature optical source that includes:

At least one thin layer of an active laser material which in addition has non-linear properties;

A pump laser emitting a beam at a wavelength allowing pumping of the thin layer of active laser material perpendicularly to the plane of this layer;

An optical cavity formed by two mirrors whose coefficients of reflection are maximum at the lasing wavelength of the active material.

The invention also concerns a method of construction of a miniature optical source, having the following construction steps:

Construction of a thin plate of active laser material of a determined frequency and having non-linear properties at this frequency;

Treatment of the main faces of the film so as to maximize their coefficient of reflection for the light waves at the determined frequency;

Cutting of the treated film into parts;

Association of each part obtained with the output face of a pump laser.

BRIEF DESCRIPTION OF THE DRAWINGS

The various purposes and characteristics of the invention will become clearer on reading the description below and examining the figures in the appendix:

FIGS. 5 and 6: variants of the device according to the invention.

DETAILED DESCRIPTION OF THE INVENTION

It has been shown recently that it is possible to obtain a laser effect in a thin film or thin plate of neodymium-doped YAG pumped by a beam emitted by a diode laser. In this experiment, the mirrors constituting the cavity are formed directly on the material; the latter can be coupled directly to the semiconductor pump laser.

We propose, according to the invention, to make a source emitting in the visible spectrum by making the thin film from active material which is non-linear and which can therefore perform frequency doubling to convert an infrared wave into a visible one.

Figure 1:
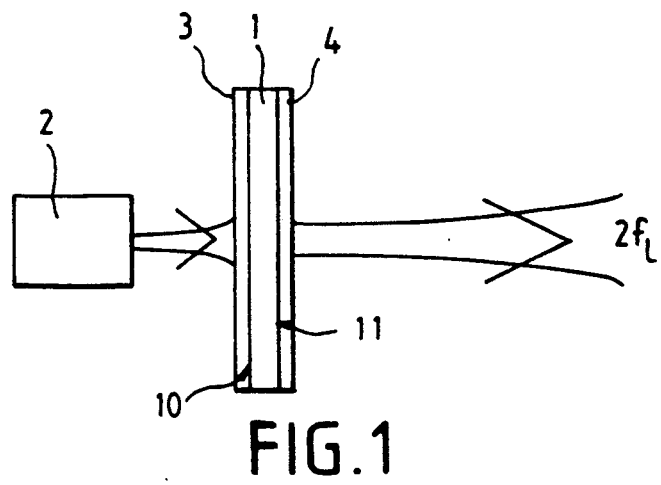
FIG. 1: an example of an optical source according to the invention.

FIG. 1 shows an example of a miniature optical source according to the invention including a part 1 of non-linear material whose faces 10 and 11 are equipped with mirrors or reflecting surfaces 3 and 4 having a coefficient of reflection which is maximum for a fundamental wavelength corresponding to a determined frequency $f_1$. These reflecting surfaces are preferably obtained by an appropriate treatment of the faces 10 and 11.

A pump laser 2 emits a light beam of frequency $f_p$.

The material of layer 1 and its thickness are chosen such that:

First, lasing occurs at a frequency $f_1$;

Secondly, frequency doubling occurs by a non-linear effect.

In these conditions the layer 1 generates from the pump wave of frequency $f_p$ a wave at the frequency of the second harmonic $2f_1$.

Since the layer of this material can be very thin (less than 1 mm for example, or about 100 microns), this device is very compact and in fact displays a very small active surface, which means that may identical devices can be manufactured collectively.

Figure 2:
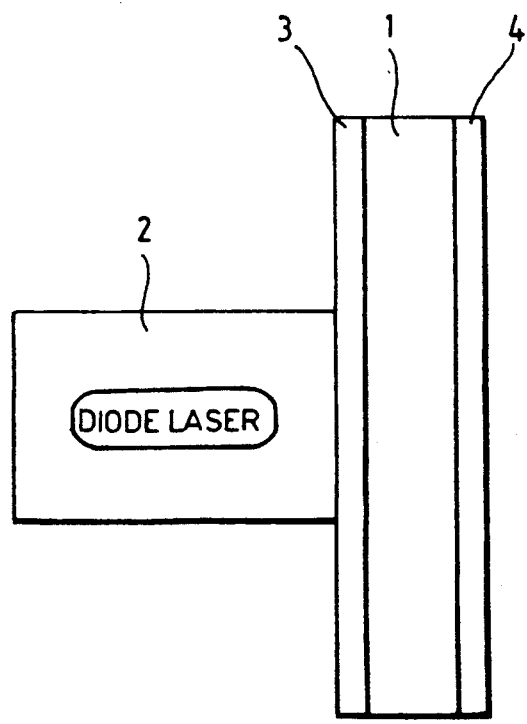
FIG. 2: a variant of the example of the invention shown in FIG. 1.

In addition, the use of very small thicknesses of material can avoid the use of intermediate optics between the pump laser and the non-linear active film (or non-linear active plate). For example, this film could be very close to the output face of the pump laser, which reduces the size of the beam in the film, as shown in FIG. 2.

The active, non-linear material 1 can be $Nd:YAl_3(BO_3)_4$ or $Nd:LiNbO_3$ doped with neodymium for example. In the case of $Nd:LiNbO_3$, to be more precise, the normal of the thin film 1 could present an angle of about 80° relative to the optical axis of the crystal constituting the film 1 if we wish to achieve phase agreement for a fundamental wave generated by laser effect at a wavelength of about 1.06/1.09 microns. In the case of $Nd:YAl_3(BO_3)_4$, the normal to the film lies at about 32° from the optical axis of the material in order to obtain the phase agreement between waves at 1.06 and 0.53 microns.

Figure 3:
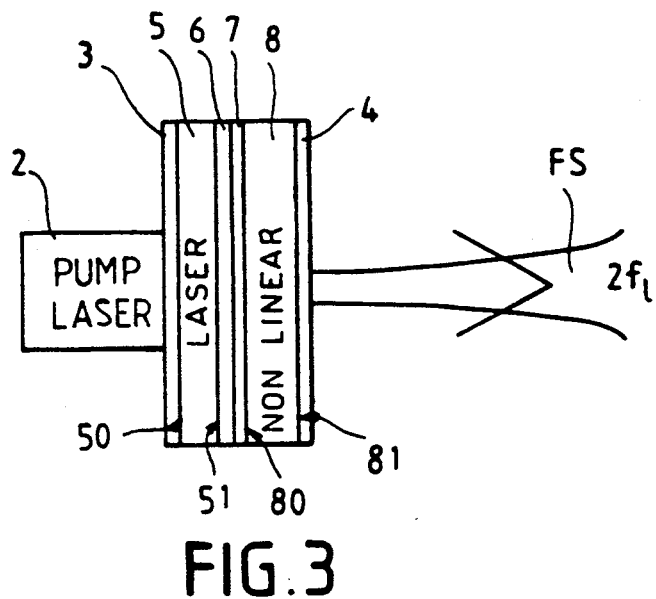
FIG. 3: another example of an optical source according to the invention.

In another configuration, such as that shown in FIG. 3, the active laser material and the non-linear material can be separate. In this case the thin films can still be used and placed one against the other. Several types of arrangement can then be considered:

The laser film is made to be reflecting at the wavelength of the fundamental wave and the non-linear film made to be reflecting either at the wavelength of the fundamental wave or at that of the harmonic.

Both the laser film and non-linear film are made to be reflecting on one face and anti-reflecting on the other.

According to the example shown in FIG. 3, the optical source according to the invention includes:

A pump laser source 2 emitting a pump light beam at fundamental frequency $f_p$.

A film 5 of active laser material receiving the pump beam through its face 50 and having a laser effect at frequency $f_1$;

A film 8 of non-linear material, stuck to the film 5 and displaying a non-linear effect at the frequency $f_1$ in such a way as to generate a wave at frequency $2f_1$.

The input face 50 of the film 1 is equipped with a means of reflection or is treated so as to permit the pump beam of frequency $f_p$ to enter but to reflect into the interior of the film 5 the waves of frequency $f_1$.

The faces 51 and 80 of the films 5 and 8 are treated to be anti-reflecting, especially at frequencies $f_1$ and $2f_1$, before they are stuck together. In this way the interface which can exist between the two films has no effect on the circulation of the waves of frequency $f_1$ and $2f_1$ within the device.

The face 81 of the film 8, which serves as the output face for the beam FS at frequency $2f_1$ produced by the light source of the invention, is equipped with a means of reflecting the waves at frequency $f_1$. This means of reflection can be a treatment of the face 81.

The faces 50 and 81, according to the example shown in FIG. 3, therefore constitute an optical cavity for the film of active laser material 5.

The coefficient of reflection of the face 81 can also be minimum at light frequency $2f_1$.

The association of the two films therefore constitutes a laser with a device which doubles the intercavity frequency.

The advantage of such a configuration lies in the possibility of optimizing separately the laser and the frequency doubling device while preserving the compactness of the system.

In addition, according to the invention, it is possible to make collectively the optical sources described previously. For this the film is made of an active laser material with a fundamental frequency $f_1$ and displaying a non-linear effect at this frequency. The principal faces of the film are treated (deposit of reflective layers) so as to maximize the coefficient of reflection at frequency $f_1$.

The film is next cut into parts and each part is stuck to an output face of a pump laser.

According to another method of construction of a source of the type presented in FIG. 3, a film 5 is made of active material; a layer 3 of material reflective at frequency $f_1$ is deposited on the face 50 of the film 5 whereas the face 51 receives a layer 6 of material which is anti-reflective notably at frequency $f_1$.

Furthermore, a film 8 of non-linear material is made. Its face 80 is treated to be anti-reflective, notably at frequencies $f_1$ and $2f_1$, by deposition of a layer 7 of an anti-reflecting material.

The face 81 is treated to be anti-reflective at the frequency $f_1$ by deposit of a layer 4 having a coefficient of reflection which is a maximum at frequency $f_1$ and minimum at $2f_1$.

The two films 5 and 8 are stuck together, joined by their faces 51 and 80.

Figure 4:
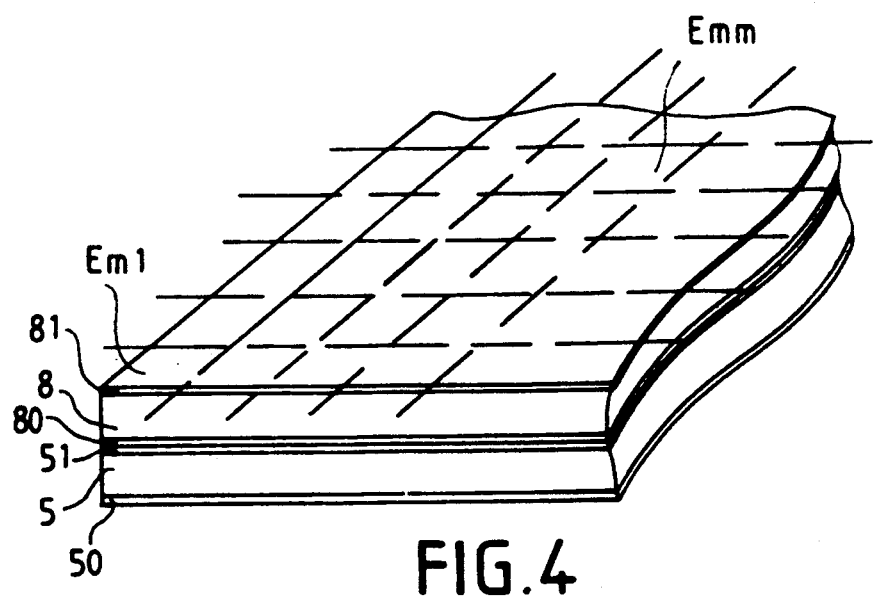
FIG. 4: a method of construction of an optical source according to the invention.

They are then cut into elements Em1, . . . Emn (shown as dashed lines in FIG. 4) and each one is stuck by its face 50 to an emitting face of a pump laser 2.

According to a variant of the invention shown in FIG. 5, a row of diode pump lasers 2.1 to 2.m is made. A film such as that described previously is stuck to the emission face of this row. The structure shown in FIG. 5 therefore includes the row of lasers 2.1 to 2.n emitting by the face E. A film 1 of active, non-linear laser material, whose faces have been suitably treated, is stuck to the face E of the row.

According to the example in FIG. 6, this design can be extended to a structure including a matrix of lasers 2.1 to 2.n. A film 1 is stuck to the emission face E of this matrix in the way described previously.

In the examples shown in FIGS. 5 and 6 the film 1 can be made using two films, as described in connection with FIG. 3.

It is clear that the preceding description is a non-restrictive example and that other variants can be envisaged within the framework of the invention. The numerical examples and the natures of the materials are given only to illustrate the description.

What is claimed is:

1. A miniature optical source, comprising:
   at least one thin layer of active laser material having non-linear properties;
   a pump laser emitting a laser beam, to impinge on said active laser material, of a wavelength allowing the thin layer of active laser material to be pumped perpendicular to a plane of the thin layer; and
   an optical cavity comprising two mirrors whose coefficients of reflection are a maximum at the laser wavelength of the active material;
   wherein the thin layer of active, non-linear laser material is $Nd:YAl_3(BO_3)_4$.

2. The miniature optical source according to claim 1, wherein one of the mirrors possesses a coefficient of reflection which is a minimum at a wavelength of a second harmonic of the laser wavelength.

3. The miniature optical source according to claim 1, wherein the mirrors of the optical cavity are constituted by opposite flat faces of the thin layer of active laser material which have been treated to make them reflective at the laser wavelength.

4. The miniature optical source according to claim 1, wherein the thin layer of active, non-linear laser material has a thickness of less than 1 mm.

5. The miniature optical source according to claim 1, wherein the thin layer includes at least one thin layer of active laser material and one thin layer of a material having non-linear optical properties.

6. The miniature optical source according to claim 5, wherein the thin layer of active laser material and the thin layer of non-linear material have their faces in contact treated to be anti-reflective at the laser wavelength and a wavelength of a second harmonic of the laser wavelength.

* * * * *